Sept. 29, 1942. J. H. ZIMMERMAN Re. 22,192

DEVICE FOR SUPPORTING TIRES IN VULCANIZERS

Original Filed Aug. 18, 1937 2 Sheets-Sheet 1

Inventor
John H. Zimmerman

By

Attorney

DEVICE FOR SUPPORTING TIRES IN VULCANIZERS

Original Filed Aug. 18, 1937 2 Sheets-Sheet 2

Inventor
John H. Zimmerman

By

Attorney

Reissued Sept. 29, 1942

Re. 22,192

UNITED STATES PATENT OFFICE 22,192

DEVICE FOR SUPPORTING TIRES IN VULCANIZERS

John H. Zimmerman, Cuyahoga Falls, Ohio, assignor to Wingfoot Corporation, Wilmington, Del., a corporation of Delaware Original No. 2,254,926, dated September 2, 1941, Serial No. 159,719, August 18, 1937. Application for reissue February 21, 1942, Serial No. 431,895

7 Claims. (Cl. 18—17)

This invention relates to vulcanizing apparatus and it refers more particularly to means for facilitating removal of finished articles from molds in which they have been vulcanized.

This invention is of especial utility in tire-vulcanizing molds from which, due to adhesion, considerable power and labor are ordinarily required for removal of the tires. However, the invention is not limited to use with tire molds and can be used with molds for other articles as indicated in the preceding paragraph. Heretofore it has been common practice to pry the tires from the lower half of the mold, this being a laborious and time-consuming operation sometimes resulting in injury to the operator.

One of the objects of this invention is to provide a simple, efficient and inexpensive means for automatically assisting in the removal of tires from vulcanizing molds which will eliminate the usual excessive labor and will save time, and with more safety to the operator.

This invention is applicable to individual steam-jacketed vulcanizers or may be applied to separable molds of the pot-heater type, or other molds having cavities in their meeting faces.

The foregoing and other objects, features and advantages of the invention will be apparent from the following description when taken in connection with the accompanying drawings, wherein one form has been shown merely by way of illustration, and in which Fig. 1 is a side elevation of a vulcanizer in opened condition and showing the novel attachment in active position;

Figures 1, 2:
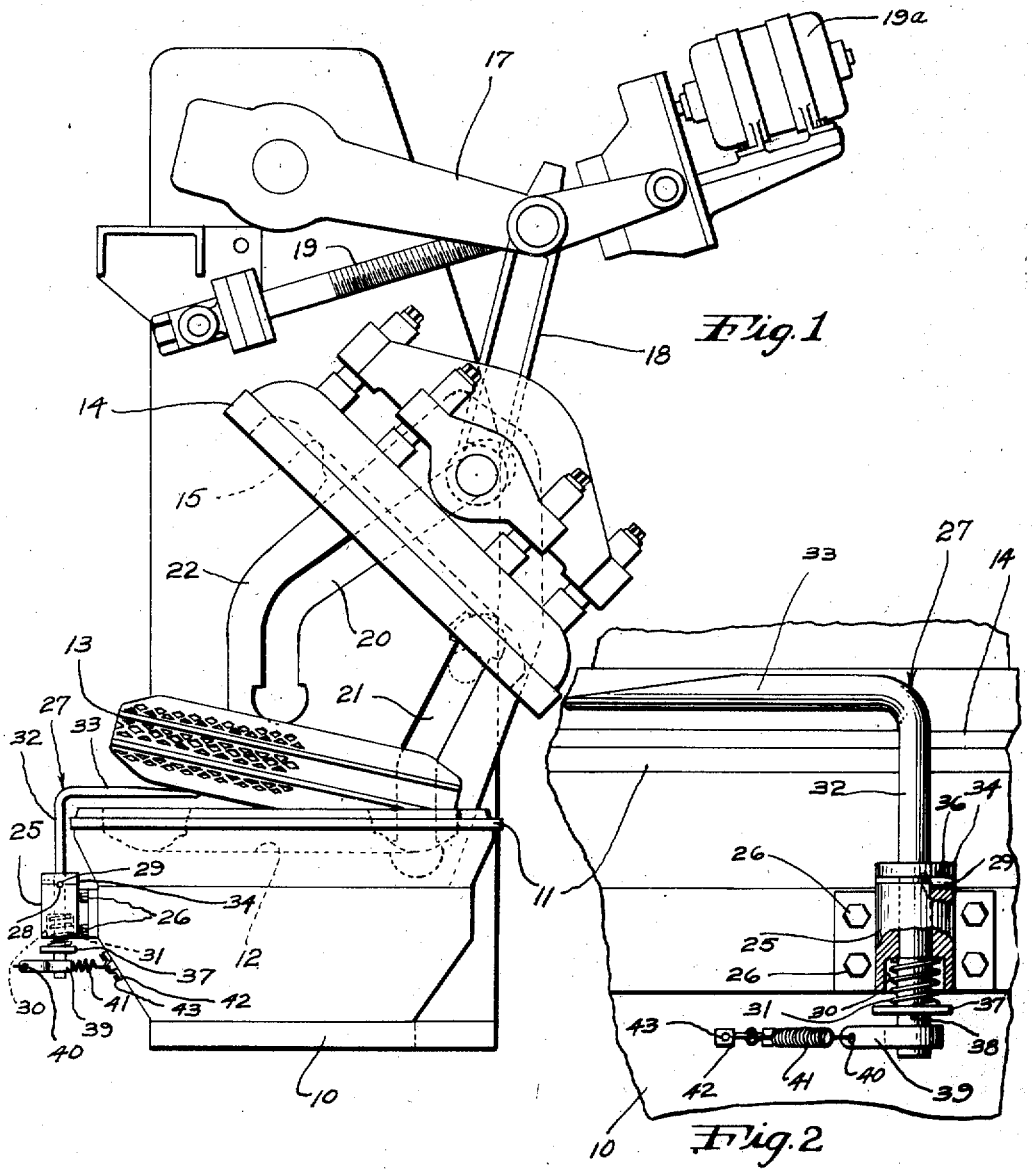
Fig. 2 is a fragmentary front elevation showing the device in inactive position.
Figure 3:
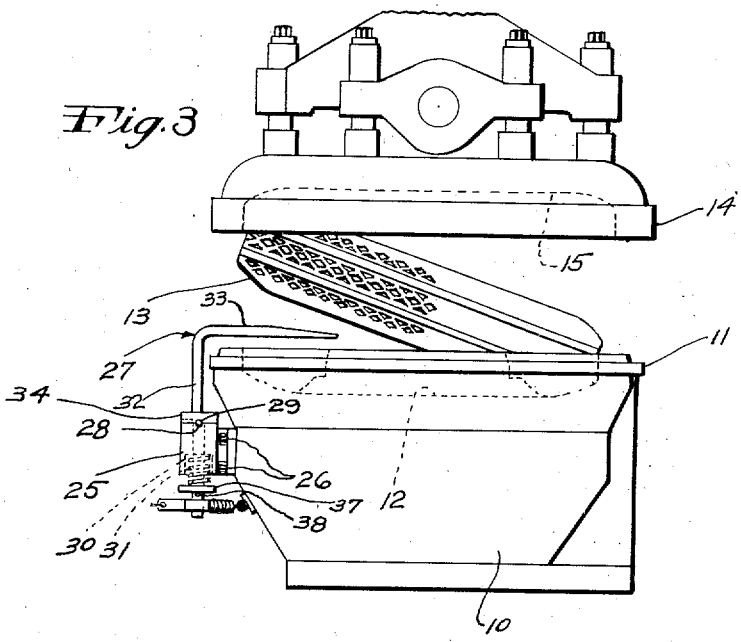
Fig. 3 is a fragmentary side elevation showing the device in active position with the tire in position about to drop from upper half of mold onto the arm.

The invention is shown in the drawings as applied to one form of steam-jacketed vulcanizer of the individual type which consists of a base 10 supporting a lower mold section 11 having an annular cavity 12 forming the lower half of the mold for the tire 13. Disposed above the lower mold section 11 is an upper mold section 14 having cut in the lower face an annular cavity 15 adapted to meet the cavitied face of the mold section 11 and to confine a tire therebetween when the mold is closed. The lower section 11 of this particular vulcanizer remains stationary, but the upper section 14 is capable of moving vertically for a certain distance and then obliquely to provide enough space between the two members for advantageously loading and unloading the vulcanizer. The movement of the upper mold section 14 is effected by a pair of toggle arms 17 and 18 through a screw 19 which, in turn, is actuated by a motor 19*a*.

The direction of travel of the member 14 is governed by enagagement of lugs (not shown) on either side of the member 14, with guide slots 20 and 21 in stationary plates 22 on either side of the vulcanizer.

The vulcanizer thus far described is merely one of several commercially available forms with which the invention may be used but to which the invention is not limited.

Referring to Figs. 1 to 4, it will be seen that on the front side of the base 10 a bearing bracket 25 is secured by cap screws 26, said bracket 25 being bored to receive a swinging arm indicated generally by the numeral 27. The body of the bearing bracket 25 is cylindrical and is provided on its upper surface with a notch 28 in which is welded a radial key 29. The lower end of the bearing bracket 25 is counterbored at 30 to receive a compression spring 31. The swinging arm 27 has a vertical portion 32 and a horizontal portion 33, said vertical portion carrying a collar 34 on the under side of which are half-round radial grooves 35 and 36. The lower surface of the collar 34 and the upper surface of the bearing bracket are held in spring-pressed relation through the action of the spring 31, which is supported by a washer 37 and cotter pin 38. Thus, as the swinging arm is manipulated to bring either of the grooves 35 and 36 into register with the radial key 29, the spring will tend to maintain such registration, keeping the arm in either active or inactive position.

Figure 4:
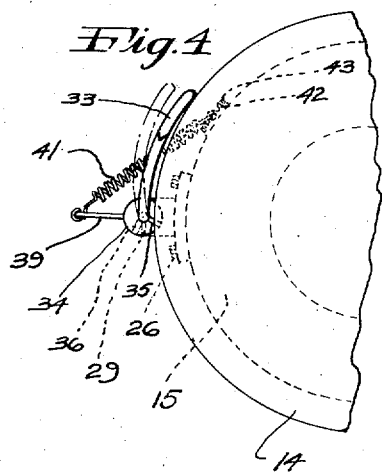
Fig. 4 is a fragmentary plan view showing the device in cocked position.
Figure 5:
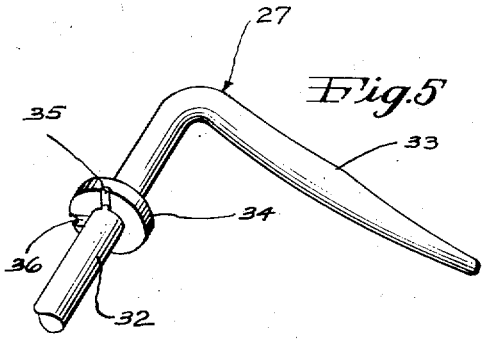
Fig. 5 is a detailed perspective view of the swinging arm per se.

Clamped or otherwise secured to the lower end of the vertical arm portion 32 is an extension 39 having in its outer end a hole 40 into which is hooked one end of a coiled tension spring 41, the other end of which is hooked into another bracket 42 attached to the base 10 by the cap screws 43, said spring 41 is for the purpose of actuating the swinging arm 27 automatically when the vulcanizer is opened, as will be more fully described later. Referring to Fig. 4, it will be noted that the horizontal or swinging portion 33 of the arm 27 is curved. This is for the purpose of conserving space, for it will be apparent that if this portion of the arm were straight (as it may be if desired), the bearing bracket 25 would have to be set out farther from the vulcanizer base 10 to allow the end of the arm to contact the outer circular edge of the upper mold section 14 when the mold is closed. Similarly, when in inactive position, if straight, the arm would extend out from the vulcanizer farther than in the illustrated embodiment. It will also be noted that the curved member 33 has its upper surface beveled at its end for the purpose of allowing the arm more easily to enter the space between the mold sections and under the tire as the vulcanizer opens. The end of the arm 33 is large enough so that it will not be retarded but will permit the irregular tread of the tire to slide by it.

When a tire is cured and the vulcanizer has opened enough to allow the arm 33 to enter the opening and contact the tire 13, the tire 13 will stick to the upper cavity of the mold and as it moves free of the lower cavity the arm, due to the action of the spring 41, will swing in under the tire and across the lower cavity, preventing tire from reentering the said cavity.

The operation is as follows:

The operator will pull the swinging arm 27 upward against the compression of spring 31 to disengage groove 35 from the key 29, then swing the arm counter-clockwise until the groove 36 engages the key 29. This will hold the arm out of the way of the operator as shown in broken lines in Fig. 4 and will permit the operator to prepare the mold cavities and place a tire in position to be cured. In preparing the mold for loading, the operator or attendant will paint, swab or spray the front half of the lower mold cavity 12 and the rear half of the upper mold cavity 15 with a non-adhesive solution, such as soap or soapstone, or other known material used for this purpose. By this method of painting, it will be possible for the tire to move freely out of the cavities at these painted points, but the upper cavity 15 in front and the lower cavity 12 in the rear not being painted, the tire will adhere to these areas long enough to permit the arm 33 to act and accomplish the purpose for which it is intended. After the cavities have been painted as described the tire is placed in the mold with its usual inflatable core and the mold closed. When this has been done the operator again raises the arm 27, disengaging the groove 36 from the key 29. This permits the end of arm 33 to contact the outer surface of the annular mold member 14, due to the action of the spring 41 as shown in Figs. 2 and 4.

When the tire has been cured and the mold starts to open, the arm 33 being positioned a little above the parting line of the mold members 11 and 14, due to the tension of the spring 41, will swing clockwise as soon as the lower edge of upper mold member 14 has raised above it. This permits the end of the arm 33 to contact the tire which naturally adheres to the upper mold cavity and moves upward with it. Meanwhile the end of arm 33 works its way inward, due to the action of the spring 41, and when the tire leaves the lower cavity the arm swings to a radial position above and across the lower cavity and is held in this position when the groove 35 interlocks with the key 29. As the upper mold member continues its upward and oblique movement, the tire will break way from the upper cavity and fall upon the arm, in which position the tire is easily and quickly removed by the operator.

The particular arrangement herein disclosed is susceptible to variations without departing from the scope of the invention as defined in the appended claims.

I claim:

1. Tire vulcanizing apparatus comprising a pair of separable circular mold sections having cavities in their meeting faces, means for moving one of the mold sections toward and from the other mold section, an arm pivoted outside of said other mold section and having a tire supporting portion movable into and out of active position adjacent the corresponding cavity when the mold sections are separated and yielding means to swing said arm to move said tire supporting portion into active position as the mold sections are separated.

2. The combination with a tire vulcanizing press having upper and lower mold sections provided with tire receiving cavities that completely enclose the tire therein, said sections being mounted to move relatively during the opening movement of the press, of a bar, and means to move the bar from a position outside the outer periphery of the mold sections to a position between the mold section cavities and beneath the tire during the said opening movement, said means comprising an arm pivoted on the press and supporting the bar, an extension connected to the arm, and yielding means to move the extension.

3. The combination with a tire press comprising upper and lower mold sections provided with tire receiving cavities that completely enclose the tire therein, at least one of said sections being movable to open the press, of a substantially horizontal swinging rod carried by the press and cooperating with the movable mold section to keep a portion of a tire between said rod and said movable mold section, said rod being swingable on the press upon opening movement of the press from a position outside the outer periphery of said mold sections to a position between the tire and said other mold section, and means for swinging the rod.

4. The combination with a tire press comprising upper and lower mold sections provided with tire receiving cavities that completely enclose the tire therein, at least the upper section being movable to open the press, of a substantially horizontal rod carried by the press and cooperating with the movable mold section to keep a portion of a tire between said rod and said upper mold section, said rod being automatically swingable upon opening movement of the upper mold section from a position outside the outer periphery of the mold sections to a position between the tire and the lower mold section, and yielding means to swing the rod.

5. The combination with a press comprising a pair of complementary mold sections provided with article receiving cavities that completely enclose the article therein, at least one of said sections being movable to open the press, of a pivoted arm on said press carrying an article engaging member at the free end thereof cooperating with said movable mold section to keep a portion of an article in the press between said article engaging member and said last mentioned mold section, said arm and member being located outside the outer periphery of the mold sections when the press is closed, and means carried by said press for pivoting said arm and member upon opening movement of the press to move said member to a position between said article and said other mold section.

6. The combination with an article vulcanizing press comprising upper and lower mold sections provided with article receiving cavities that completely enclose the article therein, at least one of said sections being movable to open the press, of an article engaging device carried by said press and located outside the outer periphery of the mold sections when the press is closed, and mechanism carried by the press and operated in timed relation to the opening of the press to move said device into the space between the mold sections, whereby said device may engage a portion of an article partially stripped from one of said mold sections so that said article will be between said device and a part of one of said mold sections.

7. The combination with an article vulcanizing press of the type comprising complementary mold sections, of an auxiliary article engaging device carried by said press and located outside the mold sections when the press is closed, said device being operable to enter the space between the mold sections and engage a portion of an article partially stripped from one of said mold sections so that said article will be between said device and a part of one of said mold sections, and mechanism carried by the press and operated in timed relation to the opening of the press to operate said device.

JOHN H. ZIMMERMAN.